US005475964A

United States Patent [19]
Fiesser et al.

[11] Patent Number: 5,475,964
[45] Date of Patent: Dec. 19, 1995

[54] TRANSVERSE HEAT-SEALING APPARATUS FOR CONTINUOUS SHRINK FILM PACKAGING

[75] Inventors: Frederick H. Fiesser, Furlong; Robert V. Jeral, Philadelphia, both of Pa.

[73] Assignee: E.I. Du Pont de Nemours and Company, Wilmington, Del.

[21] Appl. No.: 264,889

[22] Filed: Jun. 24, 1994

[51] Int. Cl.⁶ .................................................. B65B 7/20
[52] U.S. Cl. .................................................. 53/675; 53/374.6
[58] Field of Search ........................... 53/75, 76, 374.3, 53/374.5, 374.6, 51, 550, 504

[56] References Cited

U.S. PATENT DOCUMENTS

| | | | |
|---|---|---|---|
| 4,063,400 | 12/1977 | Millervoi | 53/180 |
| 4,768,327 | 9/1988 | Mosher | 53/75 |
| 4,866,914 | 9/1989 | Moribe | 53/76 |
| 4,870,802 | 10/1989 | Cerf | 53/76 |
| 5,125,216 | 6/1992 | Redaelli | 53/550 |
| 5,271,210 | 12/1993 | Tolson | 53/371.6 |
| 5,285,621 | 2/1994 | Ballestrazzi et al. | 53/374.6 |
| 5,337,542 | 8/1994 | Omori | 53/374.5 |
| 5,351,464 | 10/1994 | Francioni | 53/75 |

*Primary Examiner*—John Sipos
*Assistant Examiner*—Gene L. Kim
*Attorney, Agent, or Firm*—Peter A. Fowell

[57] ABSTRACT

An apparatus which produces consistent transverse seals in a continuous shrink film packaging operation to package trays is disclosed. The seals are consistent as a result of constant sealing dwell-time, and are also consistently positioned with respect to the trays. Neat, leak-free packages are produced after shrinking. The apparatus is particularly useful for packaging trays of moisture-containing food products such as chicken parts.

4 Claims, 2 Drawing Sheets

TRANSVERSE HEAT-SEALING APPARATUS FOR CONTINUOUS SHRINK FILM PACKAGING

BACKGROUND OF THE INVENTION

1. Field of the Invention

This invention relates to a heat-sealing apparatus associated with a continuous packaging machine, adapted to use shrink film, The apparatus heat seals a continuous tube of film surrounding filled trays spaced within it, in the transverse direction, between each tray. More particularly, the apparatus provides a predictable and consistent transverse bead-seal on the shrink film, which allows the resulting sealed film bags to be shrunk in a consistent and uniform manner around the trays, providing virtually leak-free packages.

2. Description of Prior Art

Plastic film sealed around objects provides an inexpensive packaging alternative to individually made and specifically designed packaging such as paper cartons. The film, in effect, becomes an individual plastic packaging container in the form of a sealed 'bag'.

Various types of film are used in this way, and various methods used to form the individual plastic bag. The film may be 'stretch' film, 'shrink' film, or 'hard' film (which neither stretches readily, nor is adapted to heat shrinking significantly). Each type of film requires somewhat different procedures to form it into a bag, and the bags formed may be quite different. Hard film may be made into relatively 'loose' bags surrounding the packaged object. An example is the type of bag that is used for crackers in food dispensing machines. Shrink and stretch film, by contrast, usually are formed into bags contoured tightly around the packaged object.

Many different items are packaged in these plastic bags. The item or items may be already individually packaged itself, such as in cans or boxes, and a bag formed to enclose several of the cans or boxes. The object to be packaged thus consists of several prepackaged items. Often, items may be placed in a tray and then surrounded by a bag. Food items such as chicken parts for instance are commonly 'trayed' and then bagged in plastic film. Here the object to be packaged is an open tray containing food items.

As noted, the methods of making the bag is quite varied. It may be made from film previously extruded into a robe. The tube may then be made into individual bags into which the item to be packaged is placed, then sealed at one or both ends, either thermally or with some sort of closure device. Shrink film, for instance, is used for packaging food in this way. However, a major thrust in bag type packaging is the formation of bags from a continuous roll of film sheet rather than from pre-extruded tube, where the items to be packaged may often be disposed in a tray. Here, bags are formed continuously around the item or trayed items. This is achieved by first forming the sheet into a continuous tube, around continuously supplied items or trays by continuously sealing the film edges together, longitudinally, below the item or tray, and then sealing (or cutting then sealing) the tube in the direction transverse to the direction of the moving tube and trays, into individual bags. The tube is generally formed horizontally, around the continuously fed items or trays. The items or trays in the tube are moved along, with the tube, by a horizontal conveyor. The direction in which the film, the tube formed from the film, and the item or trays travel is commonly referred to as the 'machine' direction or 'longitudinal' direction. The direction of the sealing and cutting of the formed tube tube between each tray is commonly referred to as the 'transverse' or 'cross' direction.

The general mode of continuous operation, film sheet-to-tube-to-bag, is common to many continuous packaging machines, using different type of film. However, not only are there differences in how the tube is formed, but there are major differences in the type of seal, and in how the longitudinal and transverse seals are made. There is then the question of if and how the formed bag is then operated on to finish the packaging operation. Since the method of sealing and the type of seal varies, the nature of the resulting bag will vary. Typically it will depend on the type of film—hard, stretch or shrink. Three common forms of seal are the 'fin'-seal where the film sheet is pressed together to form a fin, the 'bead'-seal, where film is pressed together, melts and forms a bead or beads (sometimes referred to as welding), and an 'overwrap'-seal, where cut ends are pressed around the item or trayed items and sealed. Fin-seals may also be subsequently overwrapped.

A continuous packaging machine of the above described general mode of operation, i.e. sheet-to-tube-to-bag, is described in U.S. Pat. No. 5,125,216 (Redaelli). In this particular case, the disclosure appears to describe formation of a loose bag from hard film, and the item is not necessarily in a tray. It uses fin type seals both in the machine and transverse direction. Fin-seals are generally not particularly tight seals, and are generally not suitable for packaging moisture containing items.

Stretch film may also be fin sealed. Commonly, overwrap type of closure rather than true sealing is also used with stretch film. As noted, fins themselves may also be overwrapped and further loosely sealed. Items such as chicken parts disposed in foamed plastic trays are extensively packaged using the general mode of 'sheet-to-tube-to-bag' packaging, using stretch film. A longitudinal fin-seal in the machine direction is formed continuously, underneath the trays, from stretched film stretched around the trays. After fin-sealing the fin is overwrapped underneath the tray, heating to affix the fin underneath. In the transverse direction, the film may not be sealed immediately, but merely cut between individual packages, and overwrapped by folding the film under the tray, and then heat sealing the overwrap. The 'bags' (using the term bag rather loosely) formed in this way from stretch film however, are highly subject to leakage of any liquid from items within the package. Furthermore, while stretching reduces the amount of film required, overwrapping excess film increases the amount of film used.

Shrink film is used extensively using continuous sheet-to-robe-to-bag type machines to package non-food objects alone, or where the object is a food or other item or items previously enclosed in, for instance, cans, boxes or bottles). Shrink film has not been utilized to any great extent in continuous packaging of food items where the film comes into direct contact with the food, particularly food containing moisture such as chicken parts disposed in open trays. Because of the general chemical and physical nature of shrink film, in contrast to stretch film, shrink film is more adaptable to sealing the film by welding into bead-seals rather than mere fin-seals. Bead-seals can only readily be formed from films when not under tension, as stretch film often is in sealing operations. Typically, heated sealing members such as bars or rolls press two sheets of film together, melting them and forming a bead on one or both sides of the sealing-bars or sealing-rolls. In the longitudinal direction, rolls are commonly used, and in the transverse directions bars are commonly used. In the longitudinal direction a bead may be formed, continuously, above sealing-rolls located underneath the trays, the bead forming between the sealing-rolls and the trays. The bead is also severed from excess film under it by the heat of the sealing-rolls. In the transverse direction, it is necessary to make two bead-seals, to seal the tube ends around both the tray ahead of, and the tray before, the sealing-bars. Here bead-seals form either side of the sealing-bars, one or both of which are heated, and the bars also heat-sever between the beads. In the longitudinal direction, the film heat-severed below the single bead is waste. In the transverse direction, where the heat-severing of film is between two beads, there is no excess film to be cut off.

With shrink film, the whole operation of forming bead-seals and then shrinking the loose formed bag to form a tight bag around trays requires a degree of precision that overwrap sealing of stretch film around trays does not require to quite the same extent or at least in the same way. The loose bag must be precisely located around the tray to be able to be shrunk around the tray in a consistent way. It is partly the type of precision required which has precluded any real penetration of shrink film into the field of continuous packaging of moisture-containing food-in-trays.

Various attempts have been made to increase the precision of the sealing operations, required for satisfactory operation of continuous packaging machines of the sheet-to-tube-to-bag type, even for stretch and hard film, as well as for shrink film. The ideal, for any type of film, is to achieve consistent and uniform seals. By consistent is meant similarity from seal to seal, and by uniform is meant uniformity along the seal itself. Consistency becomes more difficult with line speed variations which may be necessitated by unavoidable variation in the size of the items to be packaged, such as size variation of chicken parts in trays. Of course with quite different objects, the size of the final package in both longitudinal and transverse direction may obviously be quite different. An ideal packaging machine should instantly adapt to and compensate for both inline size variations and to major changes in the size of objects to be packaged.

The nature and quality of a seal of any type will depend primarily on three factors: the temperature at which, pressure at which, and dwell-time during which, the seal is made. For trayed items, even if these factors are controlled adequately, the position of the seal with respect to the trays requires control. Attempts to improve the consistency of the seal itself have been made. Redaelli, previously referred to, for instance, attempts to make both longitudinal and transverse seal more consistent and uniform by means which increase the pressure of the sealing in proportion to the film speed. In this case the items were not disposed in trays and hard film appears to be used, but the same principles apply. He notes, in passing, that temperature is too difficult to control sufficiently rapidly because of thermal inertia. He makes no attempt to control the dwell-time during which the sealing occurs.

U.S. Pat. No. 4,063,400 (Millervoi) describes a packaging machine of the sheet-to-tube-to-bag type, specifically for shrink film, which attempts to control the uniformity of the transverse seal. In this case, it is the dwell-time which is the subject of control, rather than the pressure, as in Redaelli. The range of possible transverse seal dwell-times is increased by allowing vertically moving sealing elements also to move horizontally in the machine direction, travelling with the speed of the packaging objects, by having the sealing elements be housed in a horizontally movable framework (referred to here as a 'seal-head'). The length of horizontal travel can be adjusted to alter the dwell-time while the machine is running. While the dwell-time can be manually adjusted, there is no attempt to provide automatic accommodation to continuous variation is line speed, and package size. Nor is there any attempt to automatically position the seal with respect to the height and length of the package.

There remains a need in continuous shrink packaging machines of the film sheet-to tube-to-bag type, where items are disposed in trays, for high levels of consistency and uniformity of the transverse seals, together with controlled positioning of those transverse seals with respect to the trays. In addition, there is a need to accommodate linespeed fluctuations, as well as a need to be able to readily adapt to different size trays and different size items within those trays. Fulfilling this need would allow the loose formed bags to be shrunk to produce more uniform and consistent packages, without constant manual adjustments.

SUMMARY OF THE INVENTION

The invention involves the production of consistently and uniformly transversely sealed, virtually leak-proof bags, consistently and controllably positioned around trayed items, produced in continuous packaging machines of the sheet-to-tube-to-bag type, which use shrink film, the consistency and uniformity allowing consistent subsequent shrinking to produce superior shrunk film packages.

The key to the invention is that the sealing apparatus employs means for providing constant transverse seal dwell-times for consistency of the seal, It preferably also employs means for providing consistent positioning of the seal with respect to the tray. The positioning means precisely locates the height of the seal with respect to the tray as well as locating precisely the distance of the seal from the tray. While the means for providing a consistent seal as well as the means for consistently positioning that seal can each effect improvement of a shrink film packaging operation separately, the combination of the seal consistency and seal-position consistency enables the production of highly superior finished shrink-film packages, which either alone would not achieve.

Accordingly, one aspect of the invention is a transverse sealing apparatus which produces constant seal dwell-times, comprising:

(i) a conveyor belt system consisting of a conveyor belt movable in a cyclic path over a plurality of rollers, one roller being a drive roller and the other rollers being idler rollers, the cyclic path having a horizontal portion which conveys filled trays enclosed within a continuous shrink film tube along it, sections of the tube between trays undergoing a transverse seal during movement along the horizontal portion, the horizontal portion having two sections with a gap inbetween, the gap providing access for the transverse seal operation;

(ii) a seal-head which spans the horizontal portion of the cyclic path, the seal-head being capable of moving horizontally, reciprocally along the horizontal portion, firstly in the machine direction at the same speed as the trays and conveyor-belt moves, during which time sealing occurs, and secondly back to its starting position, four of the idler rollers being attached to the seal-head and movable with it, those four idler rollers positioned to provide the gap in the path of the conveyor-belt;

(iii) an upper sealing-bar and a lower sealing-bar housed within the seal-head, the bars moving vertically down from above and vertically up from below respectively, the conveyor belt, the movements of the sealing-bars forcing together the tube surface between each tray consecutively, so as to form a bead-seal either side of the sealing bars when the sealing-bars contact, the sealing-bars also heat-severing the tube between the bead-seals resulting in a bead-seal at the back of tray ahead of the sealing-bars and a bead-seal in front of tray before the sealing-bars, the sealing producing sealed bags around each tray;

(iv) a first sensor for monitoring the time contact of sealing bars occurs, at which time sealing begins;

(v) means for monitoring the tray and conveyor-belt speed;

(iv) computer means, based on sealing-bar contact time and conveyor-belt speed input, to provide a length of travel of the seal-head in the machine direction during which the bars are in contact and sealing is occuring, that length being proportional to the tube speed, thereby providing a constant sealing dwell-time.

A further aspect of the invention is that the transverse sealing device additionally provides consistent seal-location with respect to the trays. The sealing device further comprises:

(i) gearing means so that the upper sealing-bar moves down at a rate of from one to three times the rate at which the lower sealing-bar moves up, so that the seal height above the bottom of the tray may be controlled, and (ii) a sensor to detect the position of the end of the tray ahead of the seal-location, and the position of the front of the tray before the seal-location, thereby providing a measure of the distance between trays;

(iii) computer means, based on the tray position sensor and conveyor speed input, for triggering the downward movement of the sealing bars so that the seal position is at the mid-point between the trays.

DETAILED DESCRIPTION

To clarify the invention, the various aspects will be broadly described, to illustrate the principles which delineate its essential nature. A particular embodiment, which is also the preferred embodiment, will be described in detail, in relation to the broad principles.

A general design of a continuous packaging machine which feeds a sheet (often referred to as strip) of plastic film from a roll, forms the sheet around objects to be packaged, and longitudinally seals below the object, and then transversely seals between the objects is typified by the design in above mentioned U.S. Pat. No. 5,125,216 (Redaelli), which is hereby incorporated by reference.

Before the transverse sealing operation, the operation of surrounding filled trays with shrink film, from a roll of the film, followed by sealing the film below the tray to form a continuous tube, is required. This can be carried out in a similar way to that used for stretch film. A particularly effective way is that disclosed in U.S. Pat. No. 5,259,170 (Tolson), which is hereby incorporated by reference. The operation described therein is described as being suitable for heat-shrinkable film as well as for stretch-wrap film. While the transverse sealing apparatus of the present invention is independent of the particular method of enclosing the trays in tubes, the method described in this patent is highly suitable for the prior envelopment of trays spaced within a continuous tube. Further, although the best possible longitudinal seal is desirable for overall package quality, the apparatus for producing the transverse seal of this invention, the nature of that transverse seal, and its position with respect to the tray ends, is essentially independent of the longitudinal seal.

The invention is a device or apparatus operating in a continuous manner, which provides a uniform and consistent transverse seal on shrink film, around trays, and also provides for a consistent positioning of that transverse seal between trays. The transverse seal is carded out on a continuous tube enclosing fairly regularly spaced trays, resulting in sealing of the tube between the trays. While the apparatus is independent from the continuous packaging operation which forms a tube around trays, it may be viewed as part of a complete packaging machine which completes both the longitudinal seal and the transverse seal.

Figure 1:
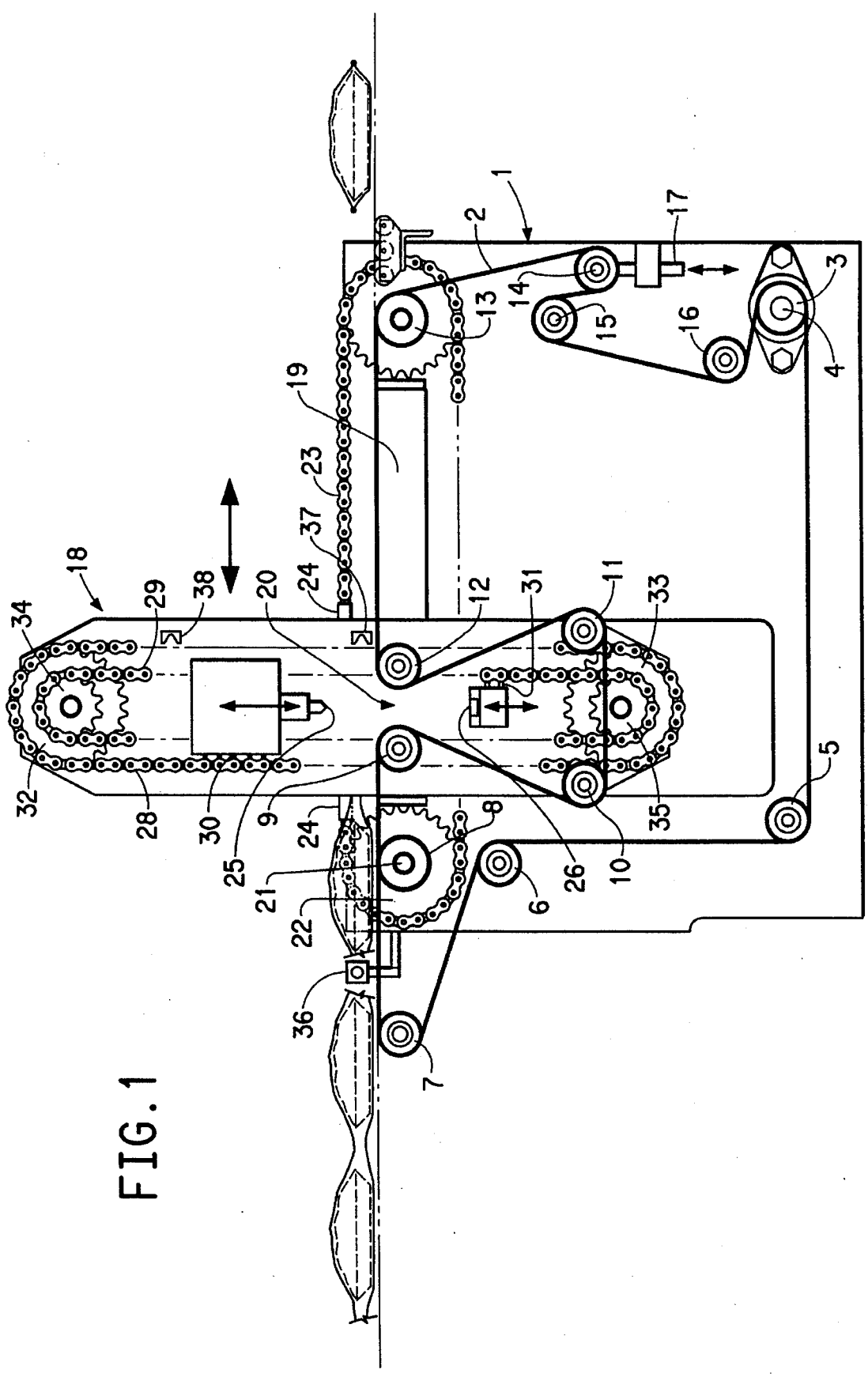
FIG. 1 is a schematic side elevation view of the apparatus

FIG. 1 is a side elevation of the transverse sealing apparatus. The apparatus is supported by a framework 1. During operation, a conveyor-belt 2 moves, over a series of rollers one of which is a roller drive, and the others roller idlers (or idler rollers). The belt is driven by a roller drive 3, connected to the conveyor-belt driveshaft, 4. The belt passes around twelve idler rollers 5, 6, 7, 8, 9, 10, 11, 12, 13, 14, 15, and 16. Rollers 14 and 15 provide a means of tensioning the belt, as needed, using tensioner 17. Trays, already enveloped in a longitudinally sealed tube, move horizontally with the tube's horizontal movement, on the conveyor-belt during the horizontal portion of the belts movement over rollers 7, 8, 9, 12 and 13. A seal-head 18 is capable of moving horizontally reciprocally, as indicated by the large double arrow, first, in the direction the belt, followed by a return movement. The seal-head movement is guided along a rail 19. Rollers 5, 6, 7, 8 and 13, 14, 15, 16 remain in a permanent position with respect to the framework of the apparatus. Rollers 9, 10, 11 and 12 are attached to the sealing-head, and so always move with it. The reciprocal movements of the seal-head (and attached rollers) are (a) forward movement in the direction of the conveyor-belt movement, and at exactly the same speed as the bell during which the sealing operation occurs, and (b) a more rapid return to its original position. The belt passing round rollers 9, 10, 11 and 12 follows a path such that it form a gap 20 between rollers 9 and 12, the gap being required for the lower sealing-bar to move up through, to seal the tube. Since the seal-head and four attached (idler) rollers, in their forward movement during sealing, move at the same speed as the belt, it will be clear that those rollers actually stop rotating during this movement. The belt, head and these four rollers are stationary with respect to each other during the forward movement during which the sealing occurs (though, of course, they move horizontally with respect to the frame). The idler rollers 5, 6, 14, 15 and 16 are conveniently located as shown, but other arrangements of rollers attached to the framework would be possible, and the number of such rollers is not critical.

Roller idler 8 is free from, but coaxial with the seal-head driveshaft 21. Its coaxial positioning is merely a convenience to avoid another axle. It could be positioned separate from the seal-head driveshaft. The seal-head is moved forward during the sealing operation by rotation of this shaft, via a toothed sprocket 22 attached to this driveshaft, which moves a chain 23 around it, the chain being attached to the sealing-head at positions 24. The rotation of the seal-head driveshaft is mechanically independent of the the rotation of the conveyor-belt driveshaft.

The seal-head driveshaft is rotatably driven by a servo motor, adjusted by an encoder to relate to the conveyor-belt driveshaft speed, so that the seal-head moves at the same speed as the conveyor-belt during its forward movement during sealing. Because the seal-head horizontal speed and the conveyor-belt speed are adjusted to be the same by the encoder, any slight variation during a continuous packaging operation, or even deliberate change in the conveyor speed, immediately causes a change in seal-head horizontal speed when in the forward direction sealing part of the seal-head cycle. In other words, the seal-head horizontal movement during sealing and the conveyor-belt movement track together at all times. The return of the seal-head to its original position occurs when, after forward motion of the head is completed, the servo motor reverses itself. Generally, the return motion is somewhat faster than the forward motion, particularly if the line speed, and hence forward motion is relatively slow.

Figure 2:
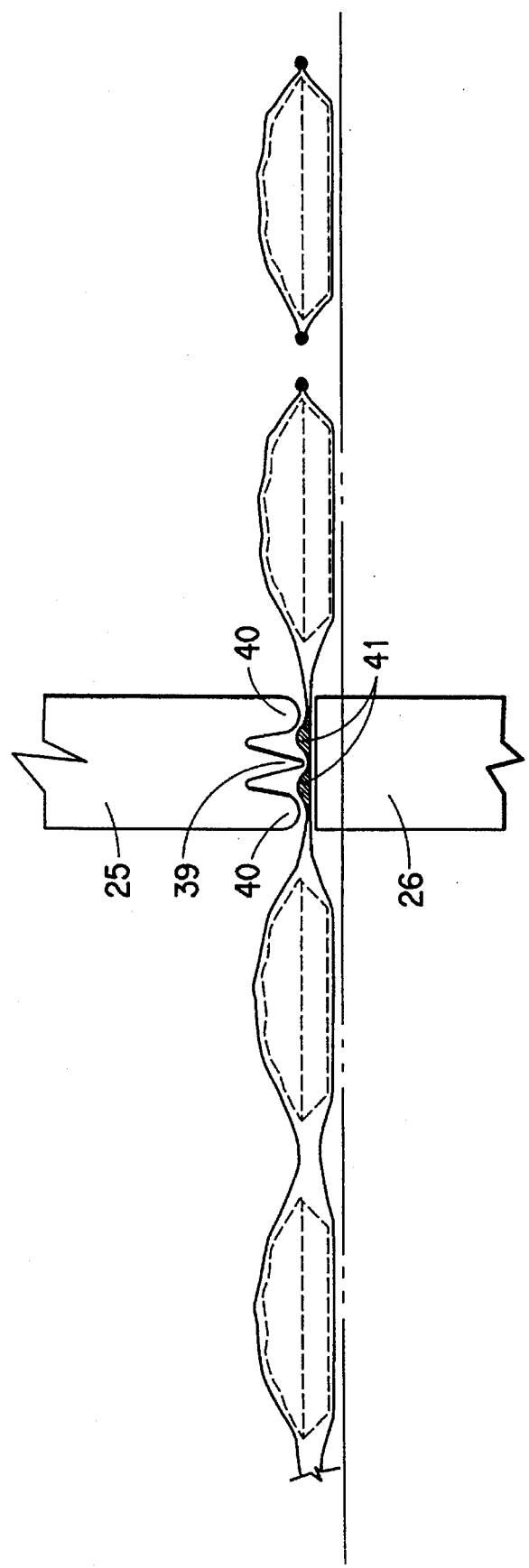
FIG. 2 is a cross-section of the sealing-bars as positioned during sealing, showing package movement between the bars.

The seal-head houses and supports two sealing members, which are an upper sealing-bar 25, and a lower sealing-bar 26. Both bars, or just the lower bar could be heated, but it is preferred to heat the upper sealing-bar. These bars move vertically, down and up respectively, contact the top and bottom of the film tube, pressing the surfaces together when the bars meet. At this point, beads form either side of the bars, and the bar further heat-severs between the beads, leaving two sealed ends—one on the back end of the package which is ahead, completing the bag formation on this package, and one on the front end of the advancing package which has yet to be sealed at its back end. The upper sealing-bar prefereably has three sections as shown in FIG. 2. The mid section 39 is a pointed knife-like section and protudes slighly below two rounded sections 40. The beads form in the positions shown 41, and the mid section, due to its protrusion, heat-severs the film between the beads. It is not especially important just when, during the horizontal sealing dwell-time, when the severing occurs, since at this point, the trays and associated film are all moving at the same speed, and will do so whether the film is severed or not. Probably, severing occurs towards the end of the dwell-time.

The vertical movement of the sealing-bars is controlled pneumatically, by air cylinders (not shown). The initiation of the closing up/down movement of the sealing-bars occurs when the computer electronically switches pneumatic valves to allow air to fill one side of the two cylinders, driving a piston in one direction, the piston geared to cause sprockets connected by chains to the sealing-bars to rotate. The chains cause upward and downward movement of the sealing-bars. The reverse, separating movement of the sealing-bars occurs when the computer again signals air to fill the other side of the two cylinders, emtyping the first side. Other computer initated drive mechanisms would be suitable.

The movement of the sealing-bars is controlled by two chains 28 and 29, attached to the sealing-bars at positions 30 and 31. These attachment positions cause the upper sealing-bar to move in the opposite direction of the lower sealing-bar, even though the chains move in the same direction at the same time. These chains pass around four sprockets, two for the upper bar 32 and 33, driven by the piston connected to the air cylinders, and two for the lower bar 34 and 35. Sprockets 32 and 34 are co-axial and are attached so they move together rotating in the same direction and at the same rate. Sprockets 33 and 35. are likewise co-axial and attached, and so rotate in the same direction and rotate together at the same rate.

In the preferred embodiment, sprockets 32 and 33 have double the number of teeth of sprockets 34 and 35. This results in the chain controlling the upper sealing-bar, moving at twice the speed as the chain controlling the lower bar. As a result, the upper sealing-bar moves down at twice the speed the lower sealing-bar moves up. The ratio of the number of teeth on the sprockets could be varied to adjust the ratio of the rate of movement of the upper-bar and lower-bar rate. A ratio of 2/1 has been found to be preferable for positioning the seal at the best height up the side of typical trays, but a ratio of from 1/1 to 3/1 is suitable to accommodate a wide variation in size (height) of trays. Of course for given sprockets, the ratio is fixed. To position the seal before shrinking so that, after shrinking, the seal line is formed at a vertical position close to the top of the tray, the top of the film is best moved about twice as far down as the bottom of the film is moved up. An additional advantage of a 2/1 ratio is that, generally, there is little space below the top of the conveyor-belt, but plenty of space above it, so the lower seal-bar is somewhat constricted.

The movements of the trays along the conveyor, the movement of the seal-head horizontally, and the movement of the sealing-bars vertically are all connected interactively to provide constant dwell-time during sealing and constant positioning of the seal with respect to the trays. This is achieved in the following way. Prior to the transverse sealing of this invention, filled trays are enveloped by a continuous film, and the film sealed longitudinally, to form a continuous tube around the trays. The filled trays enveloped within the tube leave the conveyor-belt of the prior longitudinal sealing operation, and starts its movement along the transverse seal apparatus conveyor-belt at roller 7 which is the lead-in roller. The speed of the transverse seal apparatus conveyor-belt must be slighly less than that of the previous conveyor belt (associated with the lonitudinal sealing). In this way, the trays move slightly together, relieving any tension in the tube between trays, since bead-seals can not be readily accomplished when the tube is under significant tension.

The conveyor belt movement is controlled by the rotational movement of drive roller 3 and the two movements are 'linked' together so that the position of all points on the belt relative to the path over the rollers is known precisely at all times. That is to say, it is known just where all points along the belt are at any given time.

A through-beam sensor 36, whose signal generating portion and detection portion are located either side of the belt, detects the position of the back end of the tray ahead, registering its position on the conveyor-belt (the tube surround this tray already having been sealed ahead of the tray). The sensor then detects the position of the front end of the advancing tray, registering its position on the conveyor-belt. The distance apart of the two registered positions on the conveyor belt is computed, and this is the distance apart of the trays. The mid-point position between the trays can then be translated into a location on the moving conveyor belt. This location becomes the target position for the transverse seal.

Just after the sensor has detected the front of the advancing tray the forward movement of the seal-head and the downward/upward movement of the sealing-bars within the head is initiated or 'triggered'. A control computer is fed with the inputs from the sensor 36, and has input at all times of the conveyor belt speed. The time for the downward movement of the sealing bars from triggering to contact is known. With these inputs, the trigger time of the downward movement of the bars and horizontal movement of the seal-head may readily be computed. The up/down movement of the sealing bars is generally initiated or triggered by the computer just slightly before the horizontal movement of the seal-head is started though this depends on the conveyor speed. If the packages demand very low conveyor speeds, since the closure time of the sealing bars is fixed, to hit the mid-point between package sealing position, clearly the triggering has to be initiated later. To provide some perspective regarding the times involved, the sealing-bars take about 120 milliseconds to close. The drive operating the horizontal movement of the seal-head takes typically 100 milliseconds to get up to the speed of the conveyor when the conveyor is operating at typical speeds of 7 inches per second. The conveyor can operate at speeds of from 0 to 20 inches per second (100 feet per minute).

A further sensor 37 detects the time at which sealing-bar contact occurs (i.e. seal initiation time) and feeds its signal into the controlling computer. With computer knowledge of the conveyor-belt speed at all times, a constant dwell-time of sealing may be computed and realized. After this time separation of the sealing bars is started. The seal-head continues to move forward for a short time so that the separating sealing bars have time to be clear of the advancing package. Then the servo motor reverses, and returns the seal-head to its starting position. During the seal-head return, the sealing-bars continue their separation to their fully separated position. A third sensor 38 is used to detect when the sealing bars have returned to their orignal separated position, so that the apparatus is ready to repeat the operation on succeeding packages.

The are thus three sensors which control the overall operation, each controlling independent functions. One sensor is responsible for locating the tray positions along the belt which in turn, via computer with conveyor speed input, positions the seal position at the mid point between trays. Another sensor is responsible for detecting seal initiation time, and thus, via computer with conveyor speed input, the length of seal-head horizontal movement during which sealing occurs. The third sensor merely detects when the operation is complete.

Constant dwell-time is fundamental to the whole operation, but the apparatus could operate without mid-point sensing. It could also operate without careful location of the seal vertically with respect to the tray, which is achieved by the selected sprocket ratio. Nevertheless, without the consistent seal positioning a considerably poorer, less consistent package results. A considerably improved seal is achieved with use of constant dwell-time, but a totally satisfactory package is best achieved by the combination of these two aspects of the seal—consistent seal and consistent seal-location.

With all three facets of the operation—constant dwell-time, mid-point between package sealing, and controlled position of the seal relative to the tray height, a high degree of sealing precision and uniformity is possible. This type of precision provides major advantages. The precise position of the seal, mid-point between packages, together with use of a bead-seal, makes it possible to position packages closer together, thus, in effect, increasing production rates. With stretch film, distances of up to 9 inches between packages are common. With this transverse sealing apparatus, distances between trays of as low as 2 inches are possible. The automatic self-adjusting features translate into less operator intervention, and minimum operator training.

It is to be understood that many variations of the apparatus are possible without departing from the essential nature of it.

What is claimed is:

1. A transverse sealing apparatus which forms part of a continuous packaging machine which utilizes shrink film, the apparatus adapted to producing constant transverse seal dwell-times, the apparatus comprising:

(i) a conveyor belt system consisting of a conveyor belt movable in a cyclic path over a plurality of rollers, one roller being a drive roller and the other rollers being idler rollers, the cyclic path having a horizontal portion which conveys filled trays continuously enclosed within a continuous shrink film tube along it, sections of the tube between trays undergoing a transverse seal during movement along the horizontal portion, the horizontal portion having two sections with a gap inbetween, the gap providing access for the transverse seal operation;

(ii) a seal-head which spans the horizontal portion of the cyclic path, the seal-head being capable of moving horizontally, reciprocally along the horizontal portion, firstly in the machine direction at the same speed as the trays and conveyor-belt moves, during which time sealing occurs, and secondly back to its starting position, a plurality of idler rollers being attached to the seal-head and movable with it, those idler rollers positioned to provide the gap in the path of the conveyor-belt;

(iii) an upper sealing-bar and a lower sealing-bar housed within the seal-head, the bars moving vertically down from above and vertically up from below respectively, the conveyor belt, the movements of the sealing-bars forcing together the tube surface between each tray consecutively, so as to form a bead-seal either side of the sealing bars when the sealing-bars contact, the sealing-bars also heat-severing the tube between the bead-seals resulting in a bead-seal at the back of tray ahead of the sealing-bars and a bead-seal in front of tray before the sealing-bars, the sealing producing sealed bags around each tray;

(iv) a first sensor for monitoring the time contact of sealing bars occurs, at which time sealing begins;

second sensor means to detect the position of the trailing end of a first tray and the leading end of the following tray which determines the conveyor belt speed and point of contact for the sealing bars;

(v) computer means, based on sealing-bar contact time and conveyor-belt speed input, to provide a length of travel of the seal-head in the machine direction during which the bars are in contact and sealing is occuring, that length being proportional to the tube speed, thereby providing a constant sealing dwell-time.

2. The apparatus of claim 1 wherein the reciprocal movement of the seal-head is driven by a servo-motor, controlled by an encoder which continuously adjusts the speed of the forward movement of the head to be the same as the speed of the conveyor belt, the servo motor reversing after completion of the forward movement, to return the seal-head to its starting position.

3. The apparatus of claim 1 which further provides a consistent seal location with respect to the trays, the apparatus further comprising:

(i) gearing means to control the downward rate of movement of the upper sealing-bar relative to the upward rate of movement of the lower sealing-bar, the rate of downward movement of the upper bar being so controlled as to be from one to three times the rate of upward movement of the lower sealing-bar, so that the seal height above the level of the bottom of the tray, along the transverse side of the tray, is controlled;

(ii) a second sensor to detect the position of the end of the tray ahead, and the position of the front of the advancing tray, thus providing both a measure of the distance between the those two trays and the location of the trays on the belt;

(iii) computer means for initiating the downward movement of the sealing-bars and the horizontal movement of the seal-head, the initiation times based on second sensor input of tray position and input of tray speed, so that the seal-position when the bars contact, is at the mid-point between the trays.

4. The apparatus of claim 3, wherein the ratio of the rate of downward movement of the upper sealing-bar is twice that of the rate of the upward movement of the lower sealing-bar.

* * * * *

UNITED STATES PATENT AND TRADEMARK OFFICE
CERTIFICATE OF CORRECTION

PATENT NO. : 5,475,964
DATED : December 19, 1995
INVENTOR(S) : Frederick H. Fiesser and Robert V. Jeral It is certified that error appears in the above-identified patent and that said Letters Patent is hereby corrected as shown below:

In Claim 1,

At Column 10, lines 44-48, delete the following:

"second sensor means to detect the position of the trailing end of a first tray and the leading end of the following tray which determines the conveyor belt speed and point of contact for the sealing bars;"

Signed and Sealed this

Ninth Day of April, 1996

*Attest:*

BRUCE LEHMAN

*Attesting Officer*     Commissioner of Patents and Trademarks